(12) United States Patent
Dahl et al.

(10) Patent No.: US 9,264,555 B2
(45) Date of Patent: Feb. 16, 2016

(54) CHARGING INFORMATION TRANSFER IN THE IMS

(75) Inventors: Jan Dahl, Ävsjö (SE); Ove Karlsson, Emmaboda (SE); Patrik Teppo, Bobäck (SE)

(73) Assignee: ATC Technologies, LLC, Reston, VA (US)

( * ) Notice: Subject to any disclaimer, the term of this patent is extended or adjusted under 35 U.S.C. 154(b) by 90 days.

(21) Appl. No.: 14/127,800

(22) PCT Filed: Jul. 5, 2011

(86) PCT No.: PCT/EP2011/061341
§ 371 (c)(1),
(2), (4) Date: Dec. 19, 2013

(87) PCT Pub. No.: WO2013/004303
PCT Pub. Date: Jan. 10, 2013

(65) Prior Publication Data
US 2014/0133397 A1 May 15, 2014

(51) Int. Cl.
*H04M 15/00* (2006.01)
*H04L 12/14* (2006.01)
*H04L 29/06* (2006.01)

(52) U.S. Cl.
CPC .......... *H04M 15/57* (2013.01); *H04L 12/1403* (2013.01); *H04L 12/1425* (2013.01); *H04L 65/104* (2013.01); *H04L 65/105* (2013.01); *H04L 65/1006* (2013.01); *H04L 65/1016* (2013.01); *H04L 65/1069* (2013.01); *H04L 12/1485* (2013.01)

(58) Field of Classification Search
CPC ....................................................... H04M 15/57
See application file for complete search history.

(56) References Cited

U.S. PATENT DOCUMENTS

| | | | |
|---|---|---|---|
| 2007/0280447 A1* | 12/2007 | Cai et al. | 379/114.03 |
| 2008/0010179 A1* | 1/2008 | Cai et al. | 705/34 |
| 2008/0056304 A1* | 3/2008 | Koskinen et al. | 370/486 |

(Continued)

FOREIGN PATENT DOCUMENTS

| | | | | |
|---|---|---|---|---|
| WO | WO 2010/000631 A2 | 1/2010 | | |
| WO | WO 2010/149203 A1 | 12/2010 | | |
| WO | WO 2011/010321 A1 * | 1/2011 | | H04L 12/14 |

OTHER PUBLICATIONS

International Search Report, PCT/EP2011/061341, Jul. 6, 2012.

(Continued)

*Primary Examiner* — Chirag Shah
*Assistant Examiner* — Sun Jin Kang
(74) *Attorney, Agent, or Firm* — Myers Bigel & Sibley, P.A.

(57) ABSTRACT

Apparatus for use within an IP Multimedia Subsystem, IMS, network to handle Session Initiation Protocol, SIP, messages. The apparatus comprises a receiver for receiving a SIP message from a peer IMS node, and a SIP message inspector for inspecting a P-Charging-Vector, PCV, header within a received SIP message in order to detect the presence within the PCV header of a parameter and associated handling determinator. The apparatus further comprises a SIP message handler for determining, on the basis of a handling determinator and without reference to said associated parameter, an action or actions to be applied to said parameter and associated handling determinator.

15 Claims, 5 Drawing Sheets

(56) References Cited

U.S. PATENT DOCUMENTS

| | | | | |
|---|---|---|---|---|
| 2008/0273679 | A1* | 11/2008 | Russell et al. | 379/114.28 |
| 2009/0088129 | A1* | 4/2009 | Cai et al. | 455/406 |
| 2010/0287079 | A1* | 11/2010 | Cai et al. | 705/34 |
| 2011/0159840 | A1* | 6/2011 | Cai et al. | 455/406 |
| 2011/0296035 | A1* | 12/2011 | Koskinen et al. | 709/227 |
| 2012/0102211 | A1* | 4/2012 | Dahl | 709/228 |
| 2012/0246326 | A1* | 9/2012 | Singh et al. | 709/227 |

OTHER PUBLICATIONS

Written Opinion of the International Searching Authority, PCT/EP2011/061341, Jul. 6, 2012.

3GPP TS 24.229 V9.4.0 (Jun. 2010) "$3^{rd}$ Generation Partnership Project; Technical Specification Group Core Network and Terminals; IP multimedia call control protocol based on Session Initiation Protocol (SIP) and Session Description Protocol (SDP); Stage 3 (Release 9)" 664 pages.

3GPP TS 32.240 V9.1.0 (Jun. 2010) "$3^{rd}$ Generation Partnership Project; Technical Specification Group Services and System Aspects; Telecommunication management; Charging management; Charging architecture and principles (Release 9)" 44 pages.

3GPP TS 32.260 V9.4.0 (Jun. 2010) "$3^{rd}$ Generation Partnership Project; Technical Specification Group Services and System Aspects; Telecommunication management; Charging management; IP Multimedia Subsystem (IMS) charging (Release 9)" 120 pages.

3GPP TS 32.296 V10.0.0 (Mar. 2010) "$3^{rd}$ Generation Partnership Project; Technical Specification Group Services and System Aspects; Telecommunication management; Charging management; Online Charging System (OCS): Applications and interfaces (Release 10)" 77 pages.

* cited by examiner

CHARGING INFORMATION TRANSFER IN THE IMS

CROSS REFERENCE TO RELATED APPLICATION

This application is a 35 U.S.C. §371 national stage application of PCT International Application No. PCT/EP2011/061341, filed on 5 Jul. 2011, the disclosure and content of which is incorporated by reference herein in its entirety. The above-referenced PCT International Application was published in the English language as International Publication No. WO 2013/004303 A1 on 10 Jan. 2013.

TECHNICAL FIELD

The present invention relates to charging information transfer in the IP Multimedia Subsystem and in particular to the transfer of charging information using the SIP private header P-Charging-Vector.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The Universal Mobile Telecommunications System (UMTS) is a third generation wireless system designed to provide higher data rates and enhanced services to users. The UMTS architecture includes a subsystem known as the IP Multimedia Subsystem (IMS) for supporting traditional telephony as well as new IP multimedia services. IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet. It is expected that IMS will be integrated into current and future Long Term Evolution (LTE) deployments.

The IMS makes use of the Session Initiation Protocol (SIP) to set up and control calls or sessions between user terminals (or terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Figure 1:
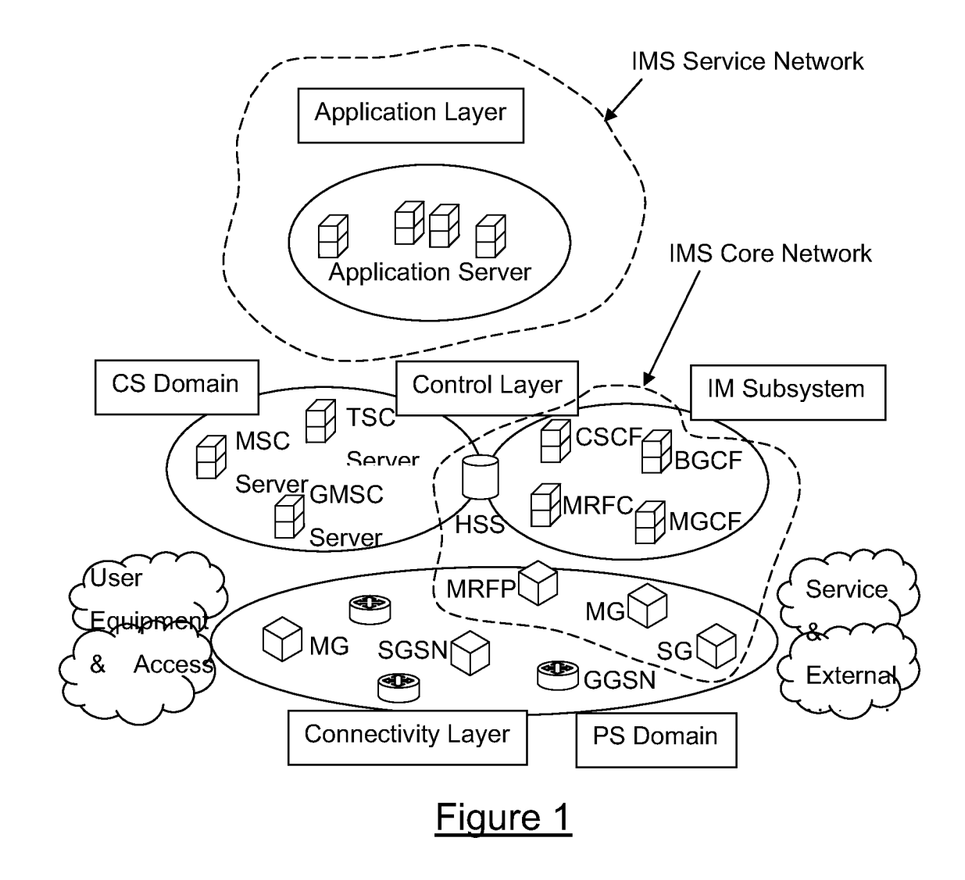
FIG. 1 illustrates schematically an IMS network integrated into a communications system comprising a 3G network.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's Subscriber Profile.

IMS implements flexible user charging schemes in respect of IMS services. In particular, IMS allows operators to charge for value added services over and above the mere transfer of data. For a given IMS session, it is possible that a number of IMS network elements will generate data required for offline and/or online charging. This is likely to become more common as the IMS evolves such that multiple ASs are used per session. To decrease the need for correlation at a (central) charging control function which collects data from multiple IMS charging elements, especially in the case of online charging (e.g. used for prepaid subscribers), it is useful to concentrate charging information at a single network element per session and to transfer all of this charging information from that single element to the charging control function. This will of course require that unique information available in other network elements be transported to the selected charging point.

One method to achieve the transport of charging information between IMS network elements within SIP messages involves the use of the SIP private header P-Charging-Vector (PCV). PCV is defined in RFC3455 with the parameters:

icid-value; the IMS Charging Identity Value. The icid-value is a charging value that identifies a dialogue or a transaction outside a dialogue. It is used to correlate charging records. An icid-value must be a globally unique value.

icid-gen-addr; the address of the SIP proxy that creates the icid-value.

orig-ioi; the originating Inter Operator Identifier.

term-ioi; the terminating Inter Operator Identifier.

generic-param; this parameter allows for the use of further parameters without the need to specify these individually. A network operator may define such further parameters for use within its own network domain in order to transport network specific information within the PCV.

The treatment of these parameters in the different network elements is described in TS 24.229. This treatment is different for each parameter and also dependent on the network element. [It is noted that, as with other SIP privacy headers, the PCV header is not included in a SIP message sent between networks if no trust relationship exists between them.] An extension to the PCV is described in 3GPP TS 24.229 (access-network-charging-info).

The generic-param may be used to carry charging related information over and above that provided for by the existing icid-value, icid-gen-addr, orig-ioi, and term-ioi parameters described above. In addition, further parameters could be specified for this purpose. However, both of these options would require that all network elements through which a message carrying the parameter can pass are updated to include appropriate behaviour, i.e. the added information must be known and understood by all of the affected network elements. This would be a complicated process particularly in a multi-vendor solution, i.e. where different vendors supply different parts of an operator's network.

SUMMARY

It is an object of the present invention to overcome or at least mitigate the problem discussed above. This is achieved at least in part by introducing a PCV parameter handling determinator, the purpose of which is to identify a high level action to a network element, for example whether or not the parameter needs to be processed by the element. This enables the parameter to contain non-standardised information, and in particular charging related information. The handling determinator may be a tag which points to a rule or rules for handling the parameter(s), or it may be the rule(s) itself.

According to a first aspect of the present invention there is provided apparatus for use within an IP Multimedia Subsystem, IMS, network to handle Session Initiation Protocol, SIP, messages. The apparatus comprises a receiver for receiving a SIP message from a peer IMS node, and a SIP message inspector for inspecting a P-Charging-Vector, PCV, header within a received SIP message in order to detect the presence within the PCV header of a parameter and associated handling determinator. The apparatus further comprises a SIP message handler for determining, on the basis of a handling determinator and without reference to said associated parameter, an action or actions to be applied to said parameter and associated handling determinator.

Embodiments of the invention allow network operators to make use of non-standardised PCV parameters to carry charging information over and above that carried by the currently standardised parameters. The only requirement placed upon nodes is that they be able to understand the handling determinator such as for example tags or rules, and implement a limited range of actions in dependence upon these determinators.

According to a second aspect of the present invention there is provided an IP Multimedia Subsystem network comprising a plurality of apparatus according to the above first aspect of the present invention. At least one of the apparatus within the network has a SIP message handler configured to recognise and process said parameter associated with the handling determinator, and at least one of the apparatus within the network has a SIP message handler that is not configured to recognise and process said parameter associated with the handling determinator.

According to a third aspect of the present invention there is provided apparatus for use within an IP Multimedia Subsystem, IMS, network. The apparatus comprises a charging data generator for generating charging information related to an IMS user service, and a SIP message handler for generating or receiving a SIP message related to said service, and for including within a P-Charging Vector, PCV, header of the SIP message (a) a parameter containing said charging information, and (b) a handling determinator associated with the parameter. The handling determinator defines an action or actions to be applied to said parameter and associated handling determinator by an upstream IMS node receiving the SIP message. The apparatus further comprises a SIP message sender for sending the SIP message to a peer IMS node.

According to a fourth aspect of the present invention there is provided method of handling a Session Initiation Protocol, SIP, message within an IP Multimedia Subsystem, IMS, network. The method comprises, at a first IMS network node, generating charging information in respect of an IMS user service, generating or receiving a SIP message related to said service, including within a P-Charging Vector, PCV, header of the SIP message (a) a parameter containing said charging information, and (b) a handling determinator associated with the parameter, the handling determinator defining an action or actions to be applied to said parameter and associated handling determinator by an upstream IMS node receiving the SIP message, and sending the SIP message to a peer IMS node. The method further comprises, at a second, upstream IMS network node, receiving said SIP message, inspecting the P-Charging Vector, PCV, header within the received SIP message in order to detect the presence within the PCV header of said parameter and associated handling determinator, and determining, on the basis of a handling determinator and without reference to said associated parameter, an action or actions to be applied to said parameter and associated handling determinator.

DETAILED DESCRIPTION

In order to increase the flexibility of the IP Multimedia Subsystem (IMS) specified P-Charging-Vector (PCV), whilst at the same avoiding the need to specify a range of different parameters and their behaviours at every node within an IMS network, it is proposed here to introduce a mechanism to categorise parameters or groups of parameters in the PCV which will make it possible to add new and/or proprietary parameters to the PCV and which will only need to be understood by the sender of the information and the intended receiver. Each IMS network entity or "node" through which the PCV passes will have a defined parameter handling behaviour for the categorised parameter or group of parameters, without the need to recognise the parameter itself. Once IMS network entities have been updated with the new behaviours, it is possible to introduce new PCV parameters by introducing new functionality into only the intended sending and destination entities (for the new parameters). More specifically, the new PCV parameters can define or contain charging related information that must be delivered from a first node at which the information is generated to a second node at which charging is performed.

The parameter handling behaviours may be defined for all network elements (at least within a given operator domain), but are likely to be relatively straightforward to specify. Examples of parameter handling behaviours are as follows:

Distribution Area

This behaviour specifies a network area or domain across which the parameter should be included in the PCV. The distribution area can be defined as "Local", i.e. within the home network of the node inserting the parameter in the PCV. This can be either an originating, transit or terminating network. The distribution area can also be defined as "Global", i.e. the parameter should be sent to trusted connected SIP networks or domains, i.e. limited to domains with the last part of the Fully Qualified Domain Name (FQDN) in common. It is also possible to define a limited distribution for a parameter by defining a distribution area as "Drop by (node type)" meaning that_it is possible to define a parameter for distribution only until it reaches the node type specified as argument for the "Drop by" behaviour.

Method

A method is, according to RFC 3261, the primary function that a request is meant to invoke on a server. A method is carried in the request message itself. Example methods are INVITE and BYE. The Method behaviour defines for which SIP methods the indicated distribution area should be applied, e.g. SIP INVITE.

Message Type

A message is, according to RFC 3261, data sent between SIP elements as part of the protocol. SIP messages are either requests or responses, i.e. indicates direction. The message type behaviour defines when the indicated distribution area shall be applied, for example Request, Response or both. It may also be implicitly defined such that, when no message type is defined, the default behaviour is both Request and Response.

A set of tags can be defined in order to indicate a range of different behaviour combinations for handling parameters within the IMS. As an example, table 1 below sets out six different tags, "A" to "F", specifying only the distribution and Message type, i.e. Request/Response behaviours. A tag is appended to the parameter whose behaviour handling is being defined, e.g. as a prefix (*XX*parameter). Thus, for example, a parameter having the tag "A" should be handled according to the Local and Request behaviours.

The parameter handling behaviours based on the parameter handling tags may be defined in a specification such as 3GPP TS 24.229. Specification would allow tags to be used independently of operator network boundaries, e.g. in the case where different network operators agree upon new, non-standardised PCV parameters. However, an operator may implement the behaviours only within its own network domain. In this case of course the new PCV parameter with handling tag would be removed when a message containing the PCV is sent outside of the operator's domain.

The following examples are presented to illustrate the proposed approach to PCV parameter handling.

Example 1

Charging for Multimedia Telephony (MMTel) sessions is performed in AS of the IMS network, i.e. it is the MMTel AS that reports charging data to the charging control system (e.g. using the DIAMETER protocol). Consider the scenario where unique charging information is available in a Media Gateway Controller (MGC) for incoming Circuit Switched (CS) calls, and this must be reported to the MMTel AS. The charging information is only relevant to the network containing the MGC and the MMTel AS. In addition, the information is relevant only to the requests.

For a SIP message associated with an incoming call, e.g. a SIP INVITE, the MGC will add a new parameter to the PCV within the SIP message. This parameter identifies or contains the necessary charging information, e.g. it might be the name or identity of the adjacent network from which the incoming call request is received. As the parameter is relevant only to the local (network) domain and to the requests, the MGC adds the tag "A" to the parameter (see Table 1 below). A result of this tag being included with the parameter is that the parameter will be removed upstream by any IBCF and also S-CSCF when interfacing to an untrusted AS.

Figure 2:
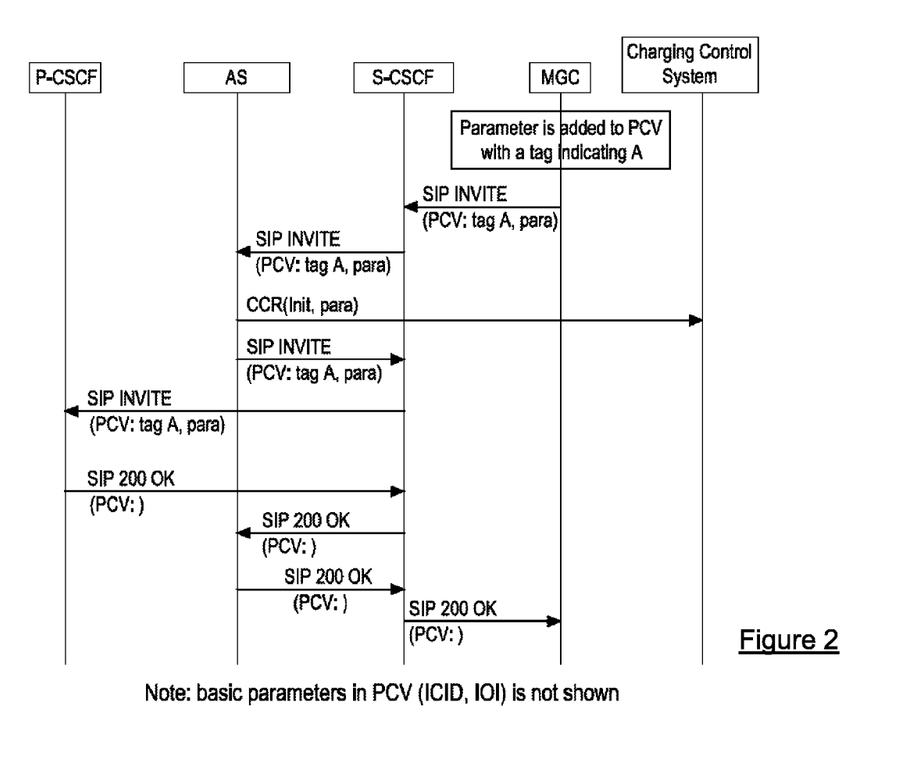
FIG. 2 is a signalling flow associated with a first exemplary scenario involving the inclusion of a tagged PCV parameter within a SIP message.

FIG. 2 shows a signalling flow associated with this scenario, where the tagged parameter is provided by the MGC to the MMTel AS ("AS"), via the S-CSCF, allowing the MMTel AS to send a Diameter Credit Control Request (CCR) command to the charging control system. The tagged parameter is further included in the INVITE forwarded to the terminating side P-CSCF. However, as the tag indicates that the parameter should be included only in the requests, the tag and parameter are not included in the 200 OK response sent from the P-CSCF to the S-CSCF.

Example 2

Figure 3:
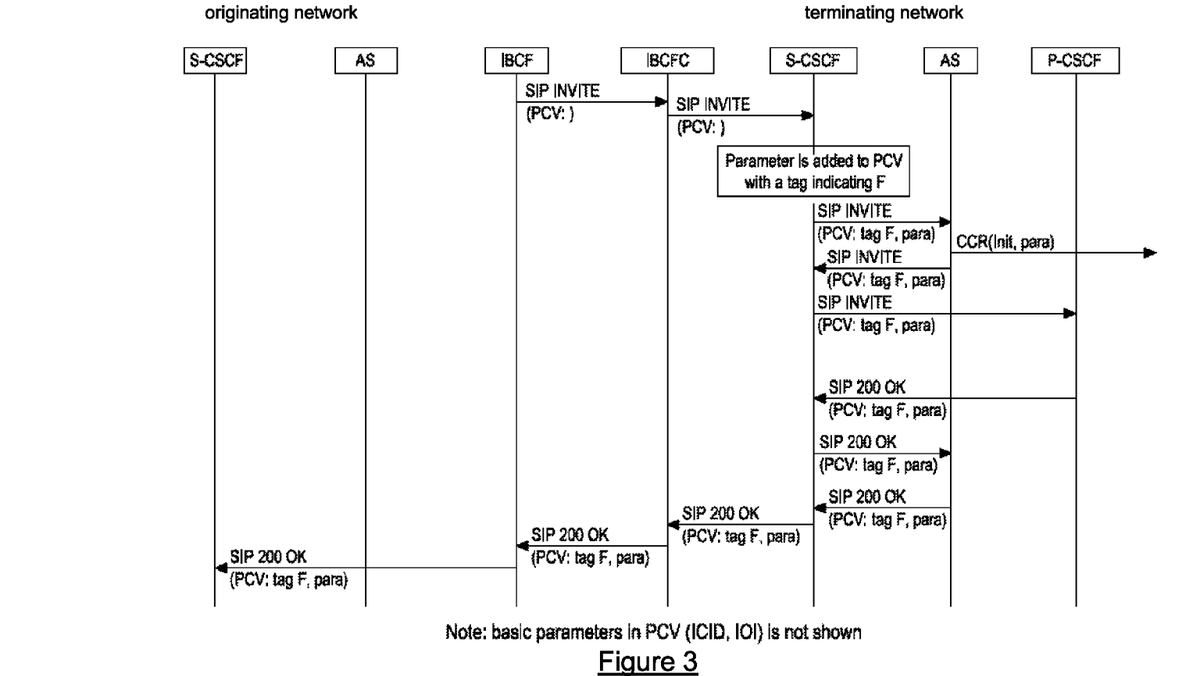
FIG. 3 is a signalling flow associated with a second exemplary scenario involving the inclusion of a tagged PCV parameter within a SIP message.

Consider now a scenario in which an S-CSCF in a terminating network adds non-standardised charging information for distribution to trusted SIP networks. As the parameter can be added in a request by the S-CSCF in the terminating network, the parameter must also be included in the response. The S-CSCF in the terminating network therefore adds the new charging information to the PCV and adds to this the tag F, i.e. indicating (according to Table 1 below) that the tagged parameter is for global distribution and for inclusion in both requests and responses. This ensures that the tagged parameter is contained within the 200 OK response returned to the S-CSCF in the originating network. The tagged parameter might include, for example, information related to the terminating network in addition to the information included within the term-ioi parameter. FIG. 3 shows a signalling flow associated with this scenario.

Figure 4:
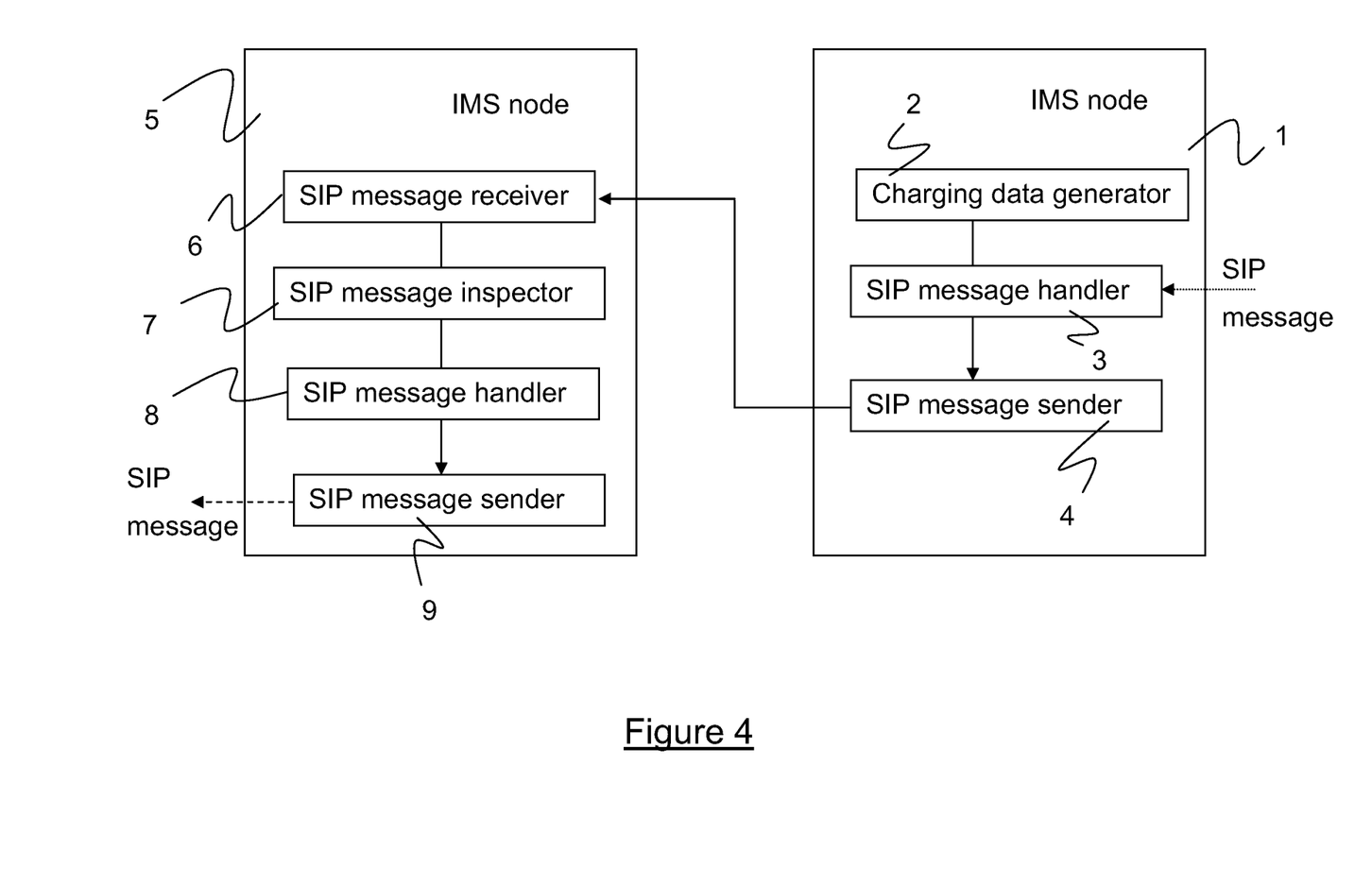
FIG. 4 illustrates schematically a first, sending IMS node and a second, receiving IMS node configured to exchange and act upon a tagged PCV parameter within a SIP message.

FIG. 4 illustrates two IMS nodes within an IMS network configured to exchange charging related information within the PCVs of SIP messages. The nodes include appropriate hardware, including memory and processors, and software for implementing the required functionality. A first of the IMS nodes 1 comprises a charging data generator 2 configured to generate charging information. This charging information is passed by the charging entity to a SIP message handler 3. The SIP message handler 3 receives or generates a SIP message for upstream transmission. The SIP message handler constructs a PCV parameter using the locally generated charging information and adds the parameter to the PCV header of the SIP message together with an appropriate tag (e.g. A to F as shown in Table 1). The tag is selected based upon certain policies installed in the SIP message handler. These policies are most likely applicable to all IMS users but, in some cases, may be user dependent (or dependent upon groups of users). Two or more tagged parameters may of course be included within the PCV as required. The PCV may also include non-tagged parameters such as the icid-value described above. The SIP message is then passed to a SIP message sender 4 for sending to upstream nodes within the IMS network.

FIG. 4 illustrates a second IMS node 5, upstream of the first node 1. This second node may be a first node in the upstream path, or may be further on in that path such that intermediate nodes are present between the first and second nodes. The second node 5 includes a SIP message receiver 6 for receiving the SIP message containing the tagged parameter(s). The SIP message is passed to a SIP message inspector 7 configured to identify the presence of a PCV within the message header and, if present, to identify tagged parameters within the PCV. In the event that a tagged parameter is present, an action or action to be applied to the parameter is determined, e.g. by inspecting Table 1 below, without reference to the parameter itself. Once determined, the message and determined action (s) is (are) passed to a SIP message handler 8 which applies the actions to the message or uses the actions to otherwise process the session. In the event that the SIP message is to be forwarded to another node, it is passed to a SIP message sender 9.

Figure 5:
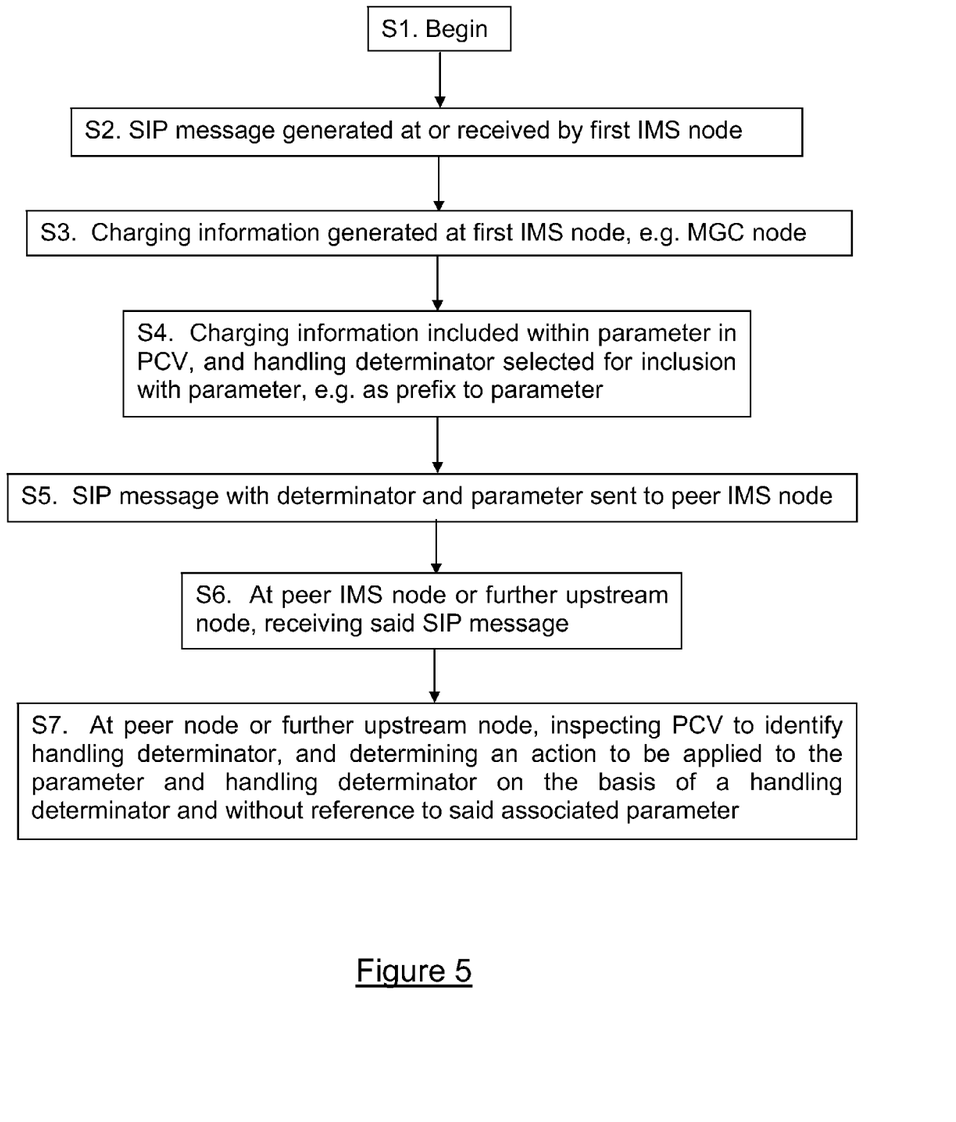
FIG. 5 is a flow diagram illustrating a process for sending charging information between IMS nodes using the PCV.

FIG. 5 further illustrates the proposed charging information distribution proposal by a way of a flow diagram. The process begins at step S1, and at step S2 a SIP message, e.g. INVITE, is received by a first IMS node. Charging information is held at, or generated by, the first IMS node at step S3. At step S4 the charging information is included within a parameter in the PCV. A handling tag is also selected and included with the parameter, e.g. as a prefix. At step S5, the SIP message with added tagged parameter is forwarded to an upstream IMS node. The SIP message is received by the upstream IMS node at step S6, and at step S7 the actions to be applied to the parameter and handling tag are determined by identifying and inspecting the tag.

Considering further the details of the new PCV parameter structure, RFC3455 describes the syntax for the P-Charging-Vector header as follows:

P-Charging-Vector="P-Charging-Vector" HCOLON icid-value*(SEMI charge-params)
charge-params=icid-gen-addr/orig-ioi/term-ioi/generic-param
icid-value="icid-value" EQUAL gen-value
icid-gen-addr="icid-generated-at" EQUAL host
orig-ioi="orig-ioi" EQUAL gen-value
term-ioi="term-ioi" EQUAL gen-value New PCV parameters are added as instances of the "generic-param".

The definitions of distribution rules can either be configured in each node or can be sent together with the PCV header. When configured in each node, a parameter as determinator is tagged to define the type of handling that is applicable for that parameter. This can be done for example by adding "A*" as part of the parameter name (A*param=123). This means also that tagging of existing parameters is not possible as they are already defined. New parameters can be defined when created to allow the addition of tags.

When the distribution rules are included as a determinator in the PCV header, they can be defined as "rule+list of parameters" or they can be defined as "parameter+rule". This approach allows each node defining a parameter to also define how it shall be handled.

The example below shows the rules included in the header according to the "parameter+rule" approach. [The example format introduces the possibility for a "redefinition" of how existing parameters shall be handled.] The distribution rules are added in a new parameter that states the rule for each parameter in question. Each node adding a PCV parameter can then also define how it shall be handled in the network. The rule is added as "generic-param" and each node inserts an instance of "rule-set" for each parameter in question:

distribution-rule="distrib-rule" EQUAL [distrib-rule]
distrib-rule=LDQUOT 1*(rule-set) RDQUOT
rule-set=LPAREN parameter SEMI distribution-area [SEMI message] RPAREN
parameter=gen-value
distribution-area="local"/"global"/drop-by
drop-by="drop-by" COLON node
node="first"/"P-CSCE"/"S-CSCE"/"I-CSCF"/"E-CSCE"/"MRFC"/"MGCF"/"AS"/"IBCF"/token
message=*(Method) [COLON message-type]
message-type="request"/"response"

This could result in the following exemplary PCV:
P-Charging-Vectoricid-value=pcscf.ims.op.se-1268-230293-50133;icid-generated-at=pcscf.ims.op.se;orig-ioi=op.com;param-a=1;param-b=2;param-c=3;param-d=4;distrib-rule="(param-a;global;INVITE)(param-b;drop-by:S-CSCF:INVITEXparam-c;local;INVITE SUBSCRIBE)(param-d;global;INVITE)"

Considering the "rule+list" approach:
distribution-rule="distrib-rule" EQUAL [distrib-rule]
distrib-rule=LDQUOT 1*(rule-set) RDQUOT
rule-set=LPAREN distribution-area [SEMI message] SEMI parameter-list RPAREN
distribution-area="local"/"global"/drop-by
drop-by="drop-by" COLON node
node="first"/"P-CSCE"/"S-CSCE"/"I-CSCF"/"E-CSCE"/"MRFC"/"MGCF"/"AS"/"IBCF"/token
message=*(Method) [COLON message-type]
message-type="request"/"response"
parameter-list=LPAREN gen-value *(COMMA gen-value) RPAREN This could result in the following exemplary PCV:
P-Charging-Vectoricid-value=pcscf.ims.op.se-1268-230293-50133;icid-generated-at=pcscf.ims.op.se;orig-ioi=op.com;param-a=1;param-b=2;param-c=3;param-d=4;distrib-rule="(global;INVITE:request;(param-a, param-d))(drop-by:S-CSCF;INVITE;(param-b))(local; INVITE SUBSCRIBE;(param-c))"

It will be appreciated by the person of skill in the art that various modifications may be made to the above described embodiments without departing from the scope of the present invention. A possible modification is to tag a set of parameters within the PCV, such that the tag applies to all parameters within the set. For example, a tag may apply to a set of subsequent parameters within the PCV. When a further tag is encountered within the PCV, that further tag applies to the subsequent set of parameters, and so on. Tags may not apply to already standardised parameters, such as the icid parameter.

TABLE 1

| Determinator | Distribution | Message type |
| --- | --- | --- |
| A | Local | Request |
| B | Local | Response |
| C | Local | Both |
| D | Global | Request |
| E | Global | Response |
| F | Global | Both |

The invention claimed is:

1. Apparatus for use within an IP Multimedia Subsystem, IMS, network to handle Session Initiation Protocol, SIP, messages, the apparatus comprising:
a receiver for receiving a SIP message from a peer IMS node;
a SIP message inspector configured to inspect a P-Charging-Vector, PCV, header within the SIP message in order to detect the presence within the PCV header of a parameter and associated handling determinator; and
a SIP message handler configured to determine, on the basis of the handling determinator and without reference to the parameter, an action or actions to be applied to the parameter and the handling determinator,
wherein the action or actions comprise:
removing, by the SIP message handler, the parameter and associated handling determinator from the SIP message before forwarding the SIP message to a further peer IMS node, in response to the further peer IMS node being located outside of a domain of the apparatus; and
retaining, by the SIP message handler, the parameter and associated handling determinator in the SIP message before forwarding the SIP message to a further peer IMS node, in response to the further peer IMS node being located inside of a domain of the apparatus.

2. Apparatus according to claim 1, wherein the SIP message handler chooses, on the basis of the handling determinator and without reference to the parameter, the action or actions from a set of actions comprising:
   a) removing the parameter and the handling determinator from the SIP message before forwarding the message to a further peer IMS node;
   b) retaining the parameter and the handling determinator in the SIP message before forwarding the message to a further peer IMS node.

3. Apparatus according to claim 1, said SIP message handler being configured to determine the action or actions to be applied to said parameter on the basis of a message type of the received SIP message and/or of a message type of a message to be sent in response to the received SIP message.

4. Apparatus according to claim 1, said SIP message handler being configured to determine whether or not the apparatus resides within a distribution domain identified by the handling determinator and to determine said action depending upon the result of the former determination.

5. Apparatus according to claim 1, wherein the action comprises storing the parameter and associated handling determinator at the apparatus to allow inclusion of the parameter and the handling determinator in a subsequent SIP message.

6. Apparatus according to claim 1, wherein said SIP message inspector is configured to detect said handling determinator as a prefix or suffix to the parameter.

7. Apparatus according to claim 1, the apparatus being configured to operate as one of:
   an IMS Application Server,
   a Call Session Control Function;
   a Media Gateway Controller; or
   an Interconnect Border Controller Function.

8. Apparatus according to claim 1, wherein said SIP message handler is configured to detect the presence within the PCV header of a set of parameters and an associated handling determinator, and the SIP message handler is configured to determine, on the basis of the handling determinator and without reference to the associated set of parameters, an action or actions to be applied to the set of parameters and associated handling determinator.

9. Apparatus according to claim 1, wherein the handling determinator comprises a handling tag or a handling rule or rules.

10. An IP Multimedia Subsystem network comprising a plurality of apparatus according to claim 1, at least one of the apparatus within the network having a SIP message handler configured to recognise and process the parameter associated with the handling determinator, and at least one of the apparatus within the network having a SIP message handler that is not configured to recognise and process the parameter associated with the handling determinator.

11. Apparatus for use within an IP Multimedia Subsystem, IMS, network and comprising:
   a charging data generator for generating charging information related to an IMS user service;
   a SIP message handler configured to generate or receive a SIP message related to said service, and configured to include within a P-Charging Vector, PCV, header of the SIP message (a) a parameter containing said charging information, and (b) a handling determinator associated with the parameter, the handling determinator defining an action or actions to be applied to said parameter and associated handling determinator by an upstream IMS node receiving the SIP message; and
   a SIP message sender for sending the SIP message to a peer IMS node,
   wherein the action or actions comprise:
      removing, by the SIP message handler, the parameter and associated handling determinator from the SIP message before forwarding the SIP message to the upstream IMS node, in response to the upstream IMS node being located outside of a domain of the apparatus; and
      retaining, by the SIP message handler, the parameter and associated handling determinator in the SIP message before forwarding the message to the upstream IMS node, in response to the upstream IMS node being located inside of a domain of the apparatus.

12. Apparatus according to claim 11, the apparatus being configured to operate as one of:
   an IMS Application Server,
   a Call Session Control Function;
   a Media Gateway Controller; or
   an Interconnect Border Controller Function.

13. A method of handling a Session Initiation Protocol, SIP, message within an IP Multimedia Subsystem, IMS, network, the method comprising:
   at a first IMS network node,
      generating charging information in respect of an IMS user service, generating or receiving a SIP message related to said service,
      including within a P-Charging Vector, PCV, header of the SIP message (a) a parameter containing said charging information, and (b) a handling determinator associated with the parameter, the handling determinator defining an action or actions to be applied to said parameter and associated handling determinator by an upstream IMS node receiving the SIP message, and
      sending the SIP message to a peer IMS node;
   at a second, upstream IMS network node,
      receiving said SIP message,
      inspecting the P-Charging Vector, PCV, header within the received SIP message in order to detect the presence within the PCV header of said parameter and associated handling determinator, and
      determining, on the basis of the handling determinator and without reference to the associated parameter, an action or actions to be applied to the parameter and associated handling determinator,
      wherein the action or actions comprise:
         removing the parameter and the handling determinator from the SIP message before forwarding the SIP message to a further IMS node, in response to the further IMS node being located outside of a domain of the second upstream IMS network node; and
         retaining, by the SIP message handler, the parameter and the handling determinator in the SIP message before forwarding the message to the further IMS node, in response to the further IMS node being located inside of a domain of the second upstream IMS network node.

14. The method according to claim 13, wherein an action is chosen from a set of actions comprising:
   a) removing the parameter and associated handling determinator from the SIP message before forwarding the message to a further peer IMS node;
   b) retaining the parameter and associated handling determinator in the SIP message before forwarding the message to a further peer IMS node.

15. The method according to claim 13, wherein the handling determinator is a handling tag or a handling rule or rules.

* * * * *